United States Patent
Koestner et al.

(10) Patent No.: US 11,552,353 B2
(45) Date of Patent: Jan. 10, 2023

(54) HYBRID POWER SUPPLY CIRCUIT, USE OF A HYBRID POWER SUPPLY CIRCUIT AND METHOD FOR PRODUCING A HYBRID POWER SUPPLY CIRCUIT

(71) Applicant: TDK Electronics AG, Munich (DE)

(72) Inventors: Stefan Koestner, Donnerskirchen (AT); Masahiro Oishi, Deutschlandsberg (AT)

(73) Assignee: TDK Electronics AG, Munich (DE)

( * ) Notice: Subject to any disclaimer, the term of this patent is extended or adjusted under 35 U.S.C. 154(b) by 531 days.

(21) Appl. No.: 16/618,760

(22) PCT Filed: May 29, 2018

(86) PCT No.: PCT/EP2018/064073
§ 371 (c)(1),
(2) Date: Dec. 2, 2019

(87) PCT Pub. No.: WO2018/219950
PCT Pub. Date: Dec. 6, 2018

(65) Prior Publication Data
US 2020/0136219 A1    Apr. 30, 2020

(30) Foreign Application Priority Data
May 31, 2017   (DE) .......................... 102017111942.6

(51) Int. Cl.
*H01M 16/00*    (2006.01)
*H01G 4/248*    (2006.01)
(Continued)

(52) U.S. Cl.
CPC ............ *H01M 16/00* (2013.01); *H01G 4/248* (2013.01); *H01G 4/30* (2013.01); *H01G 4/40* (2013.01); *H01M 10/44* (2013.01)

(58) Field of Classification Search
CPC ............ H01G 4/248; H01G 4/30; H01G 4/40; H01M 10/44; H01M 16/00
See application file for complete search history.

(56) References Cited

U.S. PATENT DOCUMENTS 5,587,250 A    12/1996 Thomas et al.
5,670,266 A    9/1997 Thomas et al.
(Continued)

FOREIGN PATENT DOCUMENTS

CN         1198257 A        11/1998
DE    202012010789 U1       4/2013
(Continued)

OTHER PUBLICATIONS

Cymbet Corporation: "EnerChip Bare Die—Rechargeable Solid State Bare Die Batteries", https://www.cymbet.com/wp-content/uploads/2019/02/DS-72-41.pdf, 2016, 13 pages.

*Primary Examiner* — Nathan Milakovich
(74) *Attorney, Agent, or Firm* — Slater Matsil, LLP

(57) ABSTRACT

A hybrid power supply circuit, a method using a hybrid power supply circuit and method for producing a hybrid power supply circuit are disclosed. In an embodiment a hybrid power-supply circuit includes a first energy-storage device and a second energy-storage device, wherein the first and second energy-storage devices are combined in a module and electrically interconnected, and wherein the first energy-storage device is a solid-state accumulator.

7 Claims, 4 Drawing Sheets

(51) Int. Cl.
*H01G 4/30* (2006.01)
*H01G 4/40* (2006.01)
*H01M 10/44* (2006.01)

(56) References Cited

U.S. PATENT DOCUMENTS

| | | | |
|---|---|---|---|
| 6,373,152 | B1 | 4/2002 | Wang et al. |
| 6,608,470 | B1 | 8/2003 | Oglesbee et al. |
| 6,805,998 | B2 | 10/2004 | Jenson et al. |
| 8,357,464 | B2 | 1/2013 | Sastry et al. |
| 10,033,037 | B2 | 7/2018 | Sato et al. |
| 2004/0161640 | A1 | 8/2004 | Salot |
| 2005/0083021 | A1 | 4/2005 | Mahon |
| 2006/0098390 | A1 | 5/2006 | Ashtiani et al. |
| 2008/0001577 | A1* | 1/2008 | Sather ............... H01M 10/0562 320/162 |
| 2008/0315377 | A1* | 12/2008 | Eichelberger ........... H01L 24/19 257/E23.114 |
| 2010/0219513 | A1* | 9/2010 | Zhang .................... H01Q 13/08 257/659 |
| 2010/0301829 | A1 | 12/2010 | Bulteau |
| 2011/0064977 | A1 | 3/2011 | Wendel et al. |
| 2013/0264875 | A1* | 10/2013 | Kaminsky ............. H01M 50/20 307/52 |
| 2013/0266827 | A1 | 10/2013 | Sastry et al. |
| 2014/0181540 | A1 | 6/2014 | Hua et al. |
| 2020/0014070 | A1 | 1/2020 | Oishi et al. |
| 2020/0287405 | A1* | 9/2020 | Rinner ..................... H02J 7/35 |

FOREIGN PATENT DOCUMENTS

| | | |
|---|---|---|
| DE | 102013112578 A1 | 5/2015 |
| GN | 106298250 A | 1/2017 |
| JP | S5457628 A | 5/1979 |
| JP | H02273036 A | 11/1990 |
| JP | 2001218381 A | 8/2001 |
| JP | 2002291175 A | 10/2002 |
| JP | 2002291176 A | 10/2002 |
| JP | 2003504819 A | 2/2003 |
| JP | 2003132941 A | 5/2003 |
| JP | 2005507544 A | 3/2005 |
| JP | 2009543295 A | 12/2009 |
| JP | 2010225390 A | 10/2010 |
| JP | 2011510608 A | 3/2011 |
| JP | 2015216222 A | 12/2015 |
| JP | 2016001597 A | 1/2016 |
| JP | 2016163021 A | 9/2016 |
| JP | 2017073468 A | 4/2017 |
| WO | 03088373 A2 | 10/2003 |
| WO | 2004061887 A1 | 7/2004 |
| WO | 2011057845 A1 | 5/2011 |
| WO | 2016176491 A1 | 11/2016 |
| WO | 2018026009 A1 | 2/2018 |

\* cited by examiner

HYBRID POWER SUPPLY CIRCUIT, USE OF A HYBRID POWER SUPPLY CIRCUIT AND METHOD FOR PRODUCING A HYBRID POWER SUPPLY CIRCUIT

This patent application is a national phase filing under section 371 of PCT/EP2018/064073, filed May 29, 2018, which claims the priority of German patent application 102017111942.6, filed May 31, 2017, each of which is incorporated herein by reference in its entirety.

TECHNICAL FIELD

The invention relates to a hybrid power supply for electrical circuits that have specific requirements as regards a power-source.

BACKGROUND

Modern electrical components are intended to have dimensions that are as small as possible, and to make ever more electrical functions available. For this purpose they need power-sources that make a supply voltage available that is as stable as possible, that withstand a large number of cycles without degradation, and that have short reaction-times to charge pulses and discharge pulses.

There is the possibility of supplying electrical devices with electrical energy by means of batteries or accumulators. Batteries or accumulators are well suited for applications with continuous load-current operation. Batteries are problematic in the case of applications with a pulsed additional load and/or an irregular charge cycle.

In the so-called Internet of Things (IoT) a large number of different electrical devices are intended to communicate with one another, preferentially via radio links. A continuous communication in this case is not necessary. Especially in devices in which sensors are running continuously and a communication with an external environment is to take place at regular or irregular intervals, the use of batteries is problematic. If the batteries are designed in such a way that the continuous load can be dealt with well, a power supply becomes problematic in the case of additional load. If a battery is designed in such a way that it can also handle additional loads, for most of the time it is oversized.

SUMMARY OF THE INVENTION

Embodiments provide a power-supply circuit that meets the aforementioned specifications.

In various embodiments a hybrid power-supply circuit comprises a first energy-storage device and a second energy-storage device. The first and second energy-storage devices have been combined in a module and electrically interconnected. The first energy-storage device is a solid-state accumulator.

The combination of two different energy-storage devices, one of which is a solid-state accumulator, allows electrical devices to be operated with a continuous permanent load and, at the same time, allows a power supply to be made available having a sufficient power for brief power surges, for example pulsed additional loads.

The use of a solid-state accumulator as first energy-storage device, which can be substantially responsible for a continuous permanent load, affords a lot of advantages: solid-state accumulators can be produced in almost any shape. Solid-state accumulators have a high energy density and can therefore be made available with small dimensions.

Such accumulators are relatively insensitive to damage and the loss of an electrolyte, since no liquid electrolyte is present. Solid-state accumulators may additionally consist of materials that are compatible with production processes for other circuit components.

The hybrid power-supply circuit described herein represents an improvement, especially in comparison with conventional hybrid systems consisting of batteries or conventional accumulators, on the one hand, and capacitors, on the other hand.

It is consequently correspondingly possible that the second energy-storage device is a capacitor. The second energy-storage device may have been selected from a ceramic capacitor, a multilayer capacitor, a multilayer ceramic capacitor and a double-layer capacitor.

Such capacitors likewise have a high energy density and permit the ongoing trend toward the miniaturization of electrical devices to be continued.

Solid-state accumulators constitute a voltage-stable power-source. Capacitors are distinguished by a high cycle strength and fast reaction to charge pulses and discharge pulses.

The described hybrid power-supply circuit is maintenance-neutral—that is to say, it has no more maintenance than conventional hybrid power-supply circuits. Rather, it makes a smaller form of construction possible, and the operational life and reliability are improved by reason of the elimination of a liquid electrolyte.

It is possible that the power-supply circuit additionally exhibits an ASIC chip (ASIC=application-specific integrated circuit) for controlling or regulating a charging process or discharging process.

Such ASICs may have been optimized in terms of particular parameters, for example energy efficiency, for a particular application. Such a circuit makes it possible to protect the accumulator against a deep discharge or against an overstressing in the course of charging.

The circuit in the ASIC chip is electrically coupled with the first energy-storage device and with the second energy-storage device.

The first energy-storage device and the second energy-storage device are likewise electrically coupled with one another. It is conceivable that the two energy-storage devices have been interconnected in series or—preferentially—in parallel.

In this case, both energy-storage devices may have been interconnected with a first terminal and with a second terminal, via which the hybrid power-supply circuit can be charged and via which the power-supply circuit can deliver electrical energy to a circuit environment.

It is possible that the first energy-storage device has been realized as a first SMD component (SMD=surface-mounted device). The second energy-storage device has been realized as a second SMD component. The first and second SMD components have been arranged one above the other or side by side and interconnected with one another. Alternatively, it is possible that the first energy-storage device and the second energy-storage device have been produced monolithically together as a multilayer system in a multilayer process.

A multilayer system has a plurality of layers of different materials arranged one above the other. In this case, dielectric layers and electrically conducting layers may alternate.

A capacitive element, for instance, may exhibit a plurality of electrode layers in metallization planes with dielectric layers arranged in between. Adjacent electrode layers arranged one above the other have been interconnected in an alternating manner with, in each instance, one of two terminal electrodes.

Analogously thereto, a solid-state accumulator may likewise exhibit stratified layers, arranged one above the other, consisting of structured electrode layers and electrolytic layers arranged in between.

Production processes for multilayer systems, for example HTCC layer stack (HTCC=high-temperature co-fired ceramics) or LTCC multilayer systems (LTCC=low-temperature co-fired ceramics) are produced by corresponding known and readily manageable multilayer processes.

It is possible to find a set of materials with which, on the one hand, a multilayer capacitor and, on the other hand, a solid-state accumulator can be produced. In this case, the materials have preferentially been selected in such a way that they are compatible with methods for producing such multilayer components.

It has accordingly been discovered that multilayer ceramic substrates can be produced that include both capacitors and solid-state accumulators. As a result, extreme energy densities and power densities can be obtained.

But the stacked arrangement of SMD components in the form of capacitors and solid-state accumulators also allow an extremely high energy density and power density.

It is preferred if the solid-state accumulator is suitable for reflow. That is to say, the solid-state accumulator is thermally so stable that it withstands the temperatures in the course of passing through a reflow soldering process without suffering damage.

It is possible, for example as an alternative to an element realized in a multilayer structure, or in addition thereto, that the second energy-storage device is a normal ceramic capacitor, a capacitor of the MegaCap type (designation of the company TDK), a capacitor of the CeraLink type, in particular of the Ultrabar type (designations of the company EPCOS), or a capacitor of a different UltraCap type or SuperCap type, or a ceramic capacitor with specially high capacitance density.

It is possible that the power-supply circuit further includes a varistor and/or a diode, for example a Zener diode, for limiting a voltage to a minimum value (for example, when discharging) or a maximum value (for example, when charging).

A varistor is a circuit element having an electrical resistance that depends on the applied voltage. The electrical resistance drops with increasing applied voltage.

The varistor has preferentially been connected parallel to the first energy-storage device and/or parallel to the second energy-storage device.

If use is made of a Zener diode, the latter likewise helps for the purpose of limiting the voltage, and/or as protection against overloading.

It is correspondingly possible that the first energy-storage device and the second energy-storage device have been interconnected directly—for example, soldered to one another.

The first and second energy-storage devices may have been arranged one above the other or side by side.

It is correspondingly also possible that the solid-state accumulator consists of materials that are compatible with a co-firing process, for example for producing an HTCC multilayer component or LTCC multilayer component.

The solid electrolyte of the solid-state accumulator may have been selected from the following compounds:
$Li_{1+x}Al_xTi_{2-x}(PO_4)_3$ ($0 \leq x \leq 0.6$)
$La_{0.5}Li_{0.5}TiO_3$,
$Li_{14}Zn(GeO_4)_4$,
$Li_7La_3Zr_2O_{12}$,
$Li_{1.3}Al_{0.3}Ti_{1.7}(PO_4)_3$,
$Li_{1.5}Al_{0.5}Ge_{1.5}(PO_4)_3$,
$Li_{3.25}Ge_{0.25}P_{0.75}S_4$,
$Li_3PS_4$,
$Li_2S\text{—}P_2S_5$,
$Li_2O\text{—}V_2O_5\text{—}SiO_2$,
$Li_3PO_4$,
$Li_{3.5}Si_{0.5}P_{0.5}O_4$,
$Li_{2.9}PO_{3.3}N_{0.46}$.

The material of the electrodes of the solid-state accumulator may have been selected from the following materials: $LiVOPO_4$ and $Li_3V_2(PO_4)_3$.

It is possible to use the power-supply circuit in an electrical component that additionally exhibits an RF transmitter, an RF receiver and/or an RF transceiver.

Corresponding antennas and front-end circuits may likewise be present.

In various embodiments a method for producing a hybrid power-supply circuit comprises the combining of a capacitor with a solid-state accumulator in a compact module.

In this connection it is possible that a layer system for the capacitor and a layer system for the solid-state accumulator are merged in a multilayer process to form a monolithic module.

In other words: the capacitor and the solid-state accumulator are produced together using processing steps for multilayer processes, so that a compact monolithically integrated module is obtained.

Electrical devices with a hybrid power-supply system of such a type, or the hybrid power-supply system of such a device, can be charged by diverse power-sources. These include photovoltaic charging systems and piezoelectric generators. Such and other charging systems differ, for example, from a charging device that is fed from a supply network by virtue of a highly variable charging power. The hybrid power-supply system is easily able to accommodate the associated irregular charging current without thermal or other problems.

The solid-state accumulator may consist of materials that are insensitive to a deep discharge, where appropriate down to 0 V. Apart from that, an ASIC can prevent a deep discharge or an overstressing when charging.

The hybrid power-supply system may include additional circuit elements, for example additional passive circuit elements or additional active circuit elements. A watchdog function may have been implemented in an ASIC chip, in order to optimize the charging of the battery, particularly in the case of irregular charge pulses.

BRIEF DESCRIPTION OF THE DRAWINGS

Important functional principles and details of preferred embodiments are elucidated in greater detail in the schematic figures.

DETAILED DESCRIPTION OF ILLUSTRATIVE EMBODIMENTS

Figure 1:
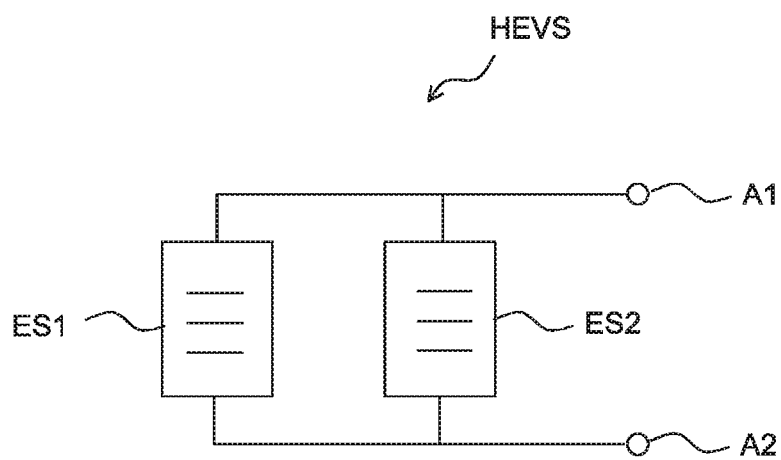
FIG. 1 shows an equivalent circuit diagram of a hybrid power-supply circuit.

FIG. 1 shows an equivalent circuit diagram of a hybrid power-supply circuit HEVS which exhibits a first energy-storage device ES1 and a second energy-storage device ES2. The first energy-storage device ES1 and the second energy-storage device ES2 have been interconnected parallel to one another. Both energy-storage devices have been interconnected a first terminal A1 and with a second terminal A2. Via the two terminals A1, A2 the hybrid power-supply circuit can deliver electrical energy to an external circuit environment or accept electrical energy from an external circuit environment.

The first energy-storage device ES1 is a solid-state accumulator. The second energy-storage device ES2 is preferentially a capacitor.

Both the first energy-storage device ES1 and the second energy-storage device ES2 may preferentially exhibit as multilayer component with electrode layers as structured elements in metallization layers and with dielectric layers or electrolytic layers arranged in between in the case of the accumulator.

Figure 2:
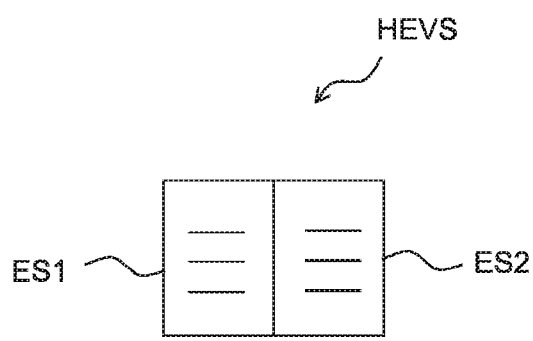
FIG. 2 shows a possible arrangement of the energy-storage devices side by side.

FIG. 2 shows a possible side-by-side arrangement of the first energy-storage device ES1 relative to the second energy-storage device ES2. It is preferred to arrange the energy-storage devices relative to one another in such a way that a structure is obtained that is overall as small as possible. Both the first energy-storage device and the second energy-storage device are preferentially multilayer components with a planar structure, in which the width and the depth may each be distinctly greater than the height.

Figure 3:
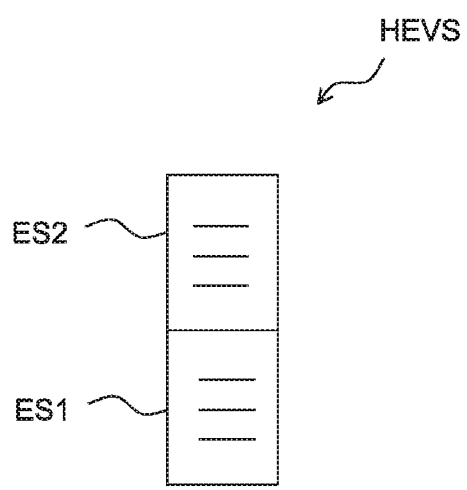
FIG. 3 shows a possible arrangement of the energy-storage devices one above the other.

FIG. 3 shows a possible arrangement of the two energy-storage devices one above the other.

Particularly when the two energy-storage devices have been realized as planar components, it is advantageous to arrange the two components one above the other.

In this way, both the first energy-storage device ES1 and the second energy-storage device ES2 can be manufactured as individual components with SMD capability. Subsequently they can be arranged one above the other and soldered together and thereby interconnected in an electrically conducting manner and firmly connected mechanically.

Figure 4:
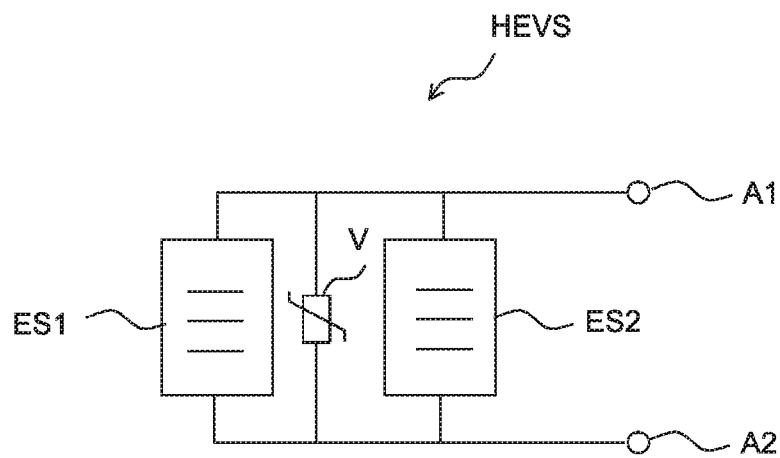
FIG. 4 shows the use of a varistor.

FIG. 4 shows a possible equivalent circuit diagram of a hybrid power-supply circuit HEVS in which a varistor V has been interconnected parallel to the first energy-storage device ES1 and parallel to the second energy-storage device ES2. The varistor constitutes a protection against overcharging when the power-supply circuit is being charged via the terminals A1, A2.

Brief voltage spikes or charge spikes can be easily intercepted by the second energy-storage device ES2.

Figure 5:
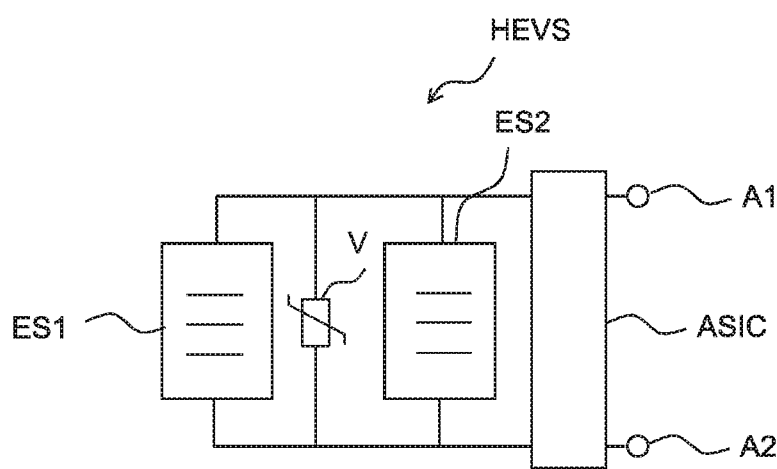
FIG. 5 shows the use of an ASIC.

FIG. 5 shows the use of an ASIC (application-specific integrated circuit). The ASIC has been connected to the energy-storage devices and to the two terminals A1, A2 and can be utilized for controlling the process of charging or the process of discharging.

The ASIC may have been embedded in an ASIC chip and designed to have an energy consumption that is as low as possible—that is to say, to operate in as energy-efficient a manner as possible.

Figure 6:
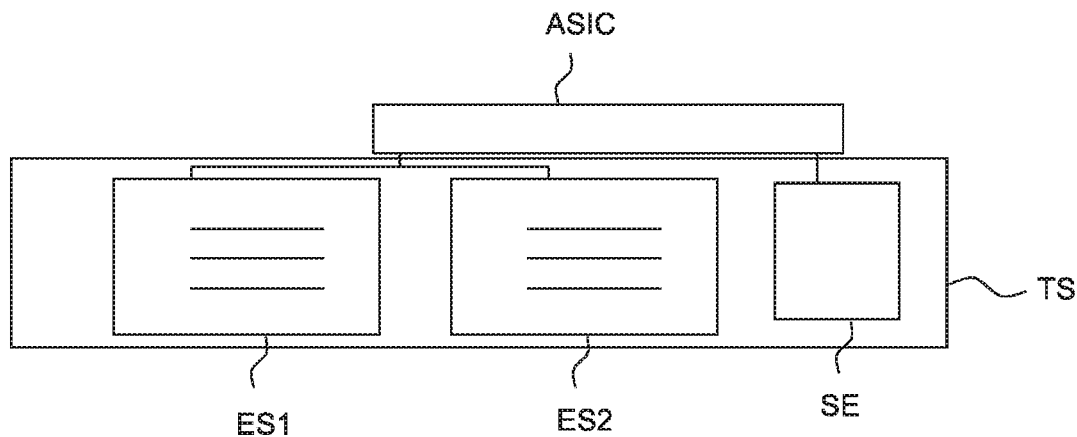
FIG. 6 shows a cross-section through a corresponding component.

FIG. 6 shows a cross-section through a component in which the first energy-storage device ES1 and the second energy-storage device ES2 have been embedded in a carrier substrate TS. An ASIC chip has been arranged on the upper side of the carrier substrate. Further circuit elements SE may have been embedded in the carrier substrate. The various components may have been interconnected via metallized signal lines in the carrier substrate or on the upper side of the carrier substrate and by virtue of through-connections through the carrier substrate.

Alternatively, it is also possible that the first and/or the second energy-storage device or further circuit elements has/have been arranged on the upper side of the carrier substrate TS and interconnected.

Figure 7:
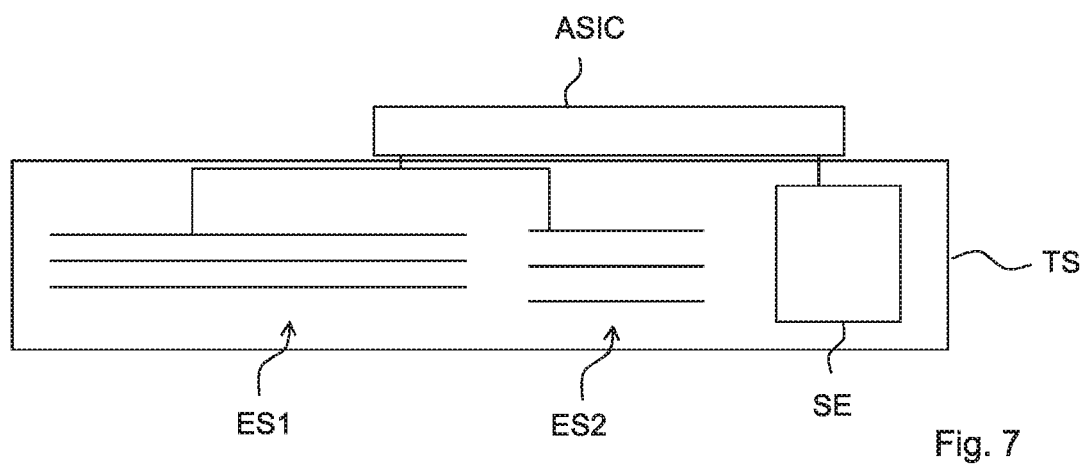
FIG. 7 shows a cross-section through an alternative embodiment of the component.

FIG. 7 shows, in a cross-section, the possibility of integrating the components of the first energy-storage device ES1 and the components of the second energy-storage device ES2 monolithically in a carrier substrate TS.

By way of carrier substrate in this case, in particular a ceramic multilayer substrate, for example an LTCC substrate or an HTCC substrate, may enter into consideration.

Figure 8:
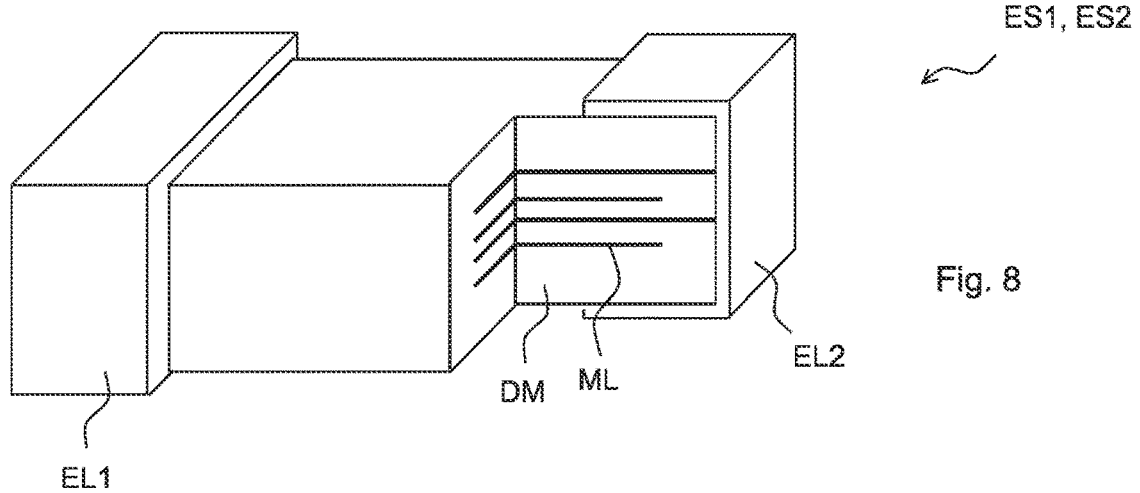
FIG. 8 shows a perspective view of a multilayer component.

FIG. 8 shows a basic structure of a multilayer component in a perspective view of an element that has been cut open for better visualization and that, for example, may represent the first energy-storage device ES1 or the second energy-storage device ES2. Metallization layers ML have been arranged in a dielectric material DM. The metallization layers ML make material available for structured electrode layers. The electrode layers have been arranged one above the other. Adjacent electrode layers have been connected and interconnected with respectively opposing electrodes EL1, EL2 as external electrodes.

Figure 9:
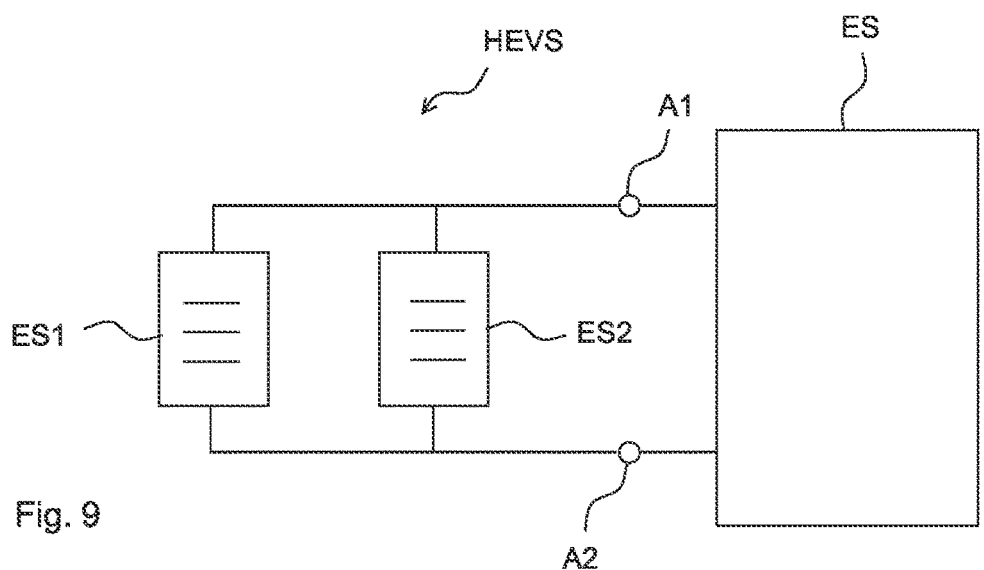
FIG. 9 shows a possible interconnection with an external circuit.

FIG. 9 shows the possibility of supplying external circuits or external circuit environments ES with electrical energy via the two terminals A1, A2. A continuous permanent load can be dealt with substantially by the first energy-storage device ES1. Additional loads that necessitate a high power can be handled by the second energy-storage device ES2.

Figure 10:
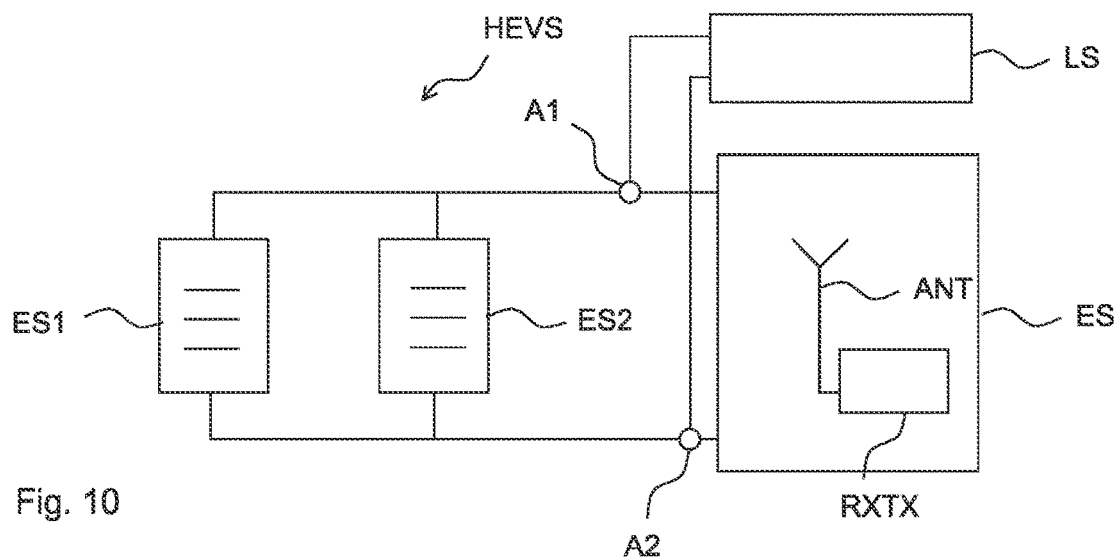
FIG. 10 shows a possible interconnection with a charging circuit.

FIG. 10 shows the possibility of supplying the energy-storage devices with electrical energy via a charging circuit LS via the terminals A1 and A2. The charging circuit may include thermal, photovoltaic or piezoelectric generators. The second energy-storage device ES2 helps for the purpose of accommodating an irregular charging current.

The external circuit may include, for instance, a transceiver RXTX and an antenna ANT, in order to communicate with an external radio environment.

The hybrid power-supply circuit is not restricted to the details of the embodiments that are shown; it may exhibit further circuit elements, such as further energy-storage devices, further integrated circuits and further switches, as well as further terminals.

The invention claimed is:

1. A hybrid power-supply circuit comprising:
   a first energy-storage device;
   a second energy-storage device,
   wherein the first and second energy-storage devices are combined in a module and electrically interconnected,
   wherein the first energy-storage device is a solid-state accumulator,
   wherein the second energy-storage device is a ceramic capacitor, a multilayer capacitor, a multilayer ceramic capacitor or a double-layer capacitor, wherein the first energy-storage device is a first SMD component and the second energy-storage device is a second SMD component, wherein the first and second SMD components are arranged one above the other or side by side, and wherein the first energy-storage device and the second energy-storage device are integrated monolithically as a multilayer system; and a varistor and/or a Zener diode configured to limit a voltage to a minimum value, wherein the hybrid power supply circuit is configured to supply power to an RF transmitter, an RF receiver and/or an RF transceiver, and wherein the solid-state accumulator is suitable for reflow.

2. The power-supply circuit according to claim 1, further comprising an ASIC chip configured to control or regulate a charging process or discharging process.

3. The power-supply circuit according to claim 1, wherein the varistor and/or the Zener diode is configured to limit a voltage to a maximum value.

4. The power-supply circuit according to claim 1, wherein the first energy-storage device and the second energy-storage device are directly soldered together.

5. The power-supply circuit according to claim 1, wherein the solid-state accumulator comprises materials that are compatible with a co-firing process.

6. A method for producing a hybrid power-supply circuit, the method comprising:

combining of a capacitor and a solid-state accumulator in a compact module, wherein the capacitor is a ceramic capacitor, a multilayer capacitor, a multilayer ceramic capacitor or a double-layer capacitor, wherein the solid-state accumulator is a first SMD component and the capacitor is a second SMD component, wherein the first and second SMD components are arranged one above the other or side by side, and wherein the solid-state accumulator and the capacitor are integrated monolithically as a multilayer system; and further combining a varistor and/or a Zener diode into the compact module, the varistor and/or the Zener diode being configured to limit a voltage to a minimum value, wherein the hybrid power supply circuit is configured to supply power to an RF transmitter, an RF receiver and/or an RF transceiver, and wherein the solid-state accumulator is suitable for reflow.

7. The method according to claim 6, further comprising merging a layer system for the capacitor and a layer system for the solid-state accumulator in a multilayer process to form a monolithic module.

* * * * *